United States Patent [19]

Semler, Jr.

[11] Patent Number: 4,637,875
[45] Date of Patent: Jan. 20, 1987

[54] FLUID FILTERING APPARATUS AND TUBULAR FILTER THEREFOR

[75] Inventor: Loren H. Semler, Jr., Mt. Prospect, Ill.

[73] Assignee: Semler Industries Inc., Franklin Park, Ill.

[21] Appl. No.: 399,273

[22] Filed: Jul. 19, 1982

Related U.S. Application Data

[63] Continuation of Ser. No. 171,166, Jul. 22, 1980, abandoned, which is a continuation of Ser. No. 16,336, Feb. 28, 1979, abandoned.

[51] Int. Cl.⁴ ............................................. B01D 25/00
[52] U.S. Cl. .................................. 210/232; 210/323.2
[58] Field of Search ...................... 210/232, 487, 323.2, 210/236, 453; 55/484

[56] References Cited

U.S. PATENT DOCUMENTS

| | | | |
|---|---|---|---|
| 832,469 | 10/1906 | Fleuss | 210/323.2 X |
| 4,105,562 | 8/1978 | Kaplan et al. | 210/232 |
| 4,111,815 | 9/1978 | Walker et al. | 210/487 |
| 4,257,894 | 3/1981 | Barney | 210/232 |

FOREIGN PATENT DOCUMENTS

| | | | |
|---|---|---|---|
| 246461 | 3/1963 | Australia | 210/323.2 |
| 2019329 | 11/1971 | Fed. Rep. of Germany | 210/323.2 |

Primary Examiner—Frank Spear
Attorney, Agent, or Firm—Tilton, Fallon, Lungmus

[57] ABSTRACT

A fluid filtering apparatus and, in particular, a tubular filter construction for use therein. Each filter consists of one or more unitary cylindrical filter elements formed of porous material suitable for filtering inks, paints, and other liquids. Each filter element has upper and lower end portions and an intermediate portion therebetween, one of the end portions having a frustoconical protrusion and the other end portion having a frusto-conical recess. Such recesses and protrusions are adapted to mate with the protrusions and recesses, respectively, of adjacent filter elements aligned therewith, or with supporting structural components of a filter housing.

19 Claims, 4 Drawing Figures

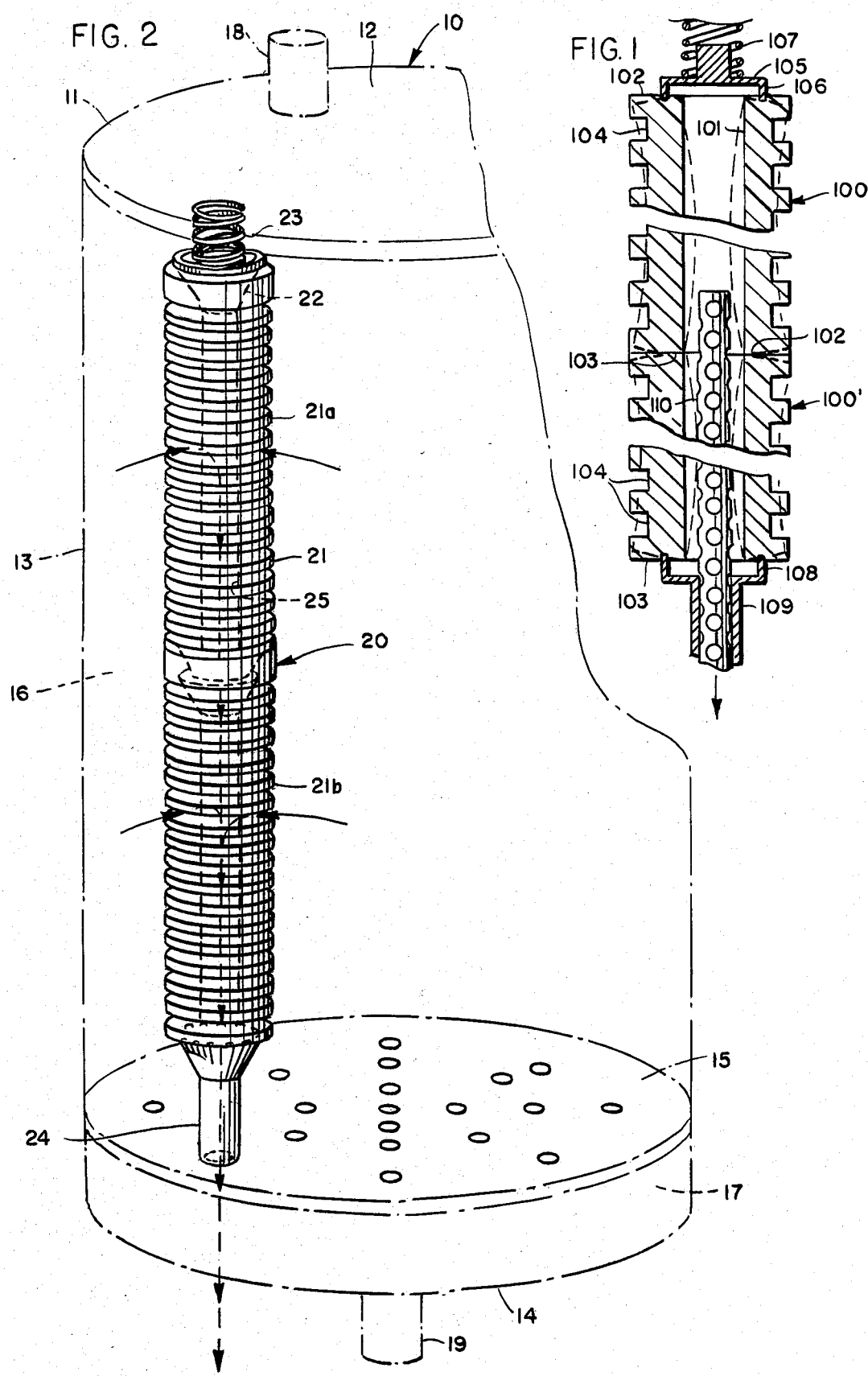

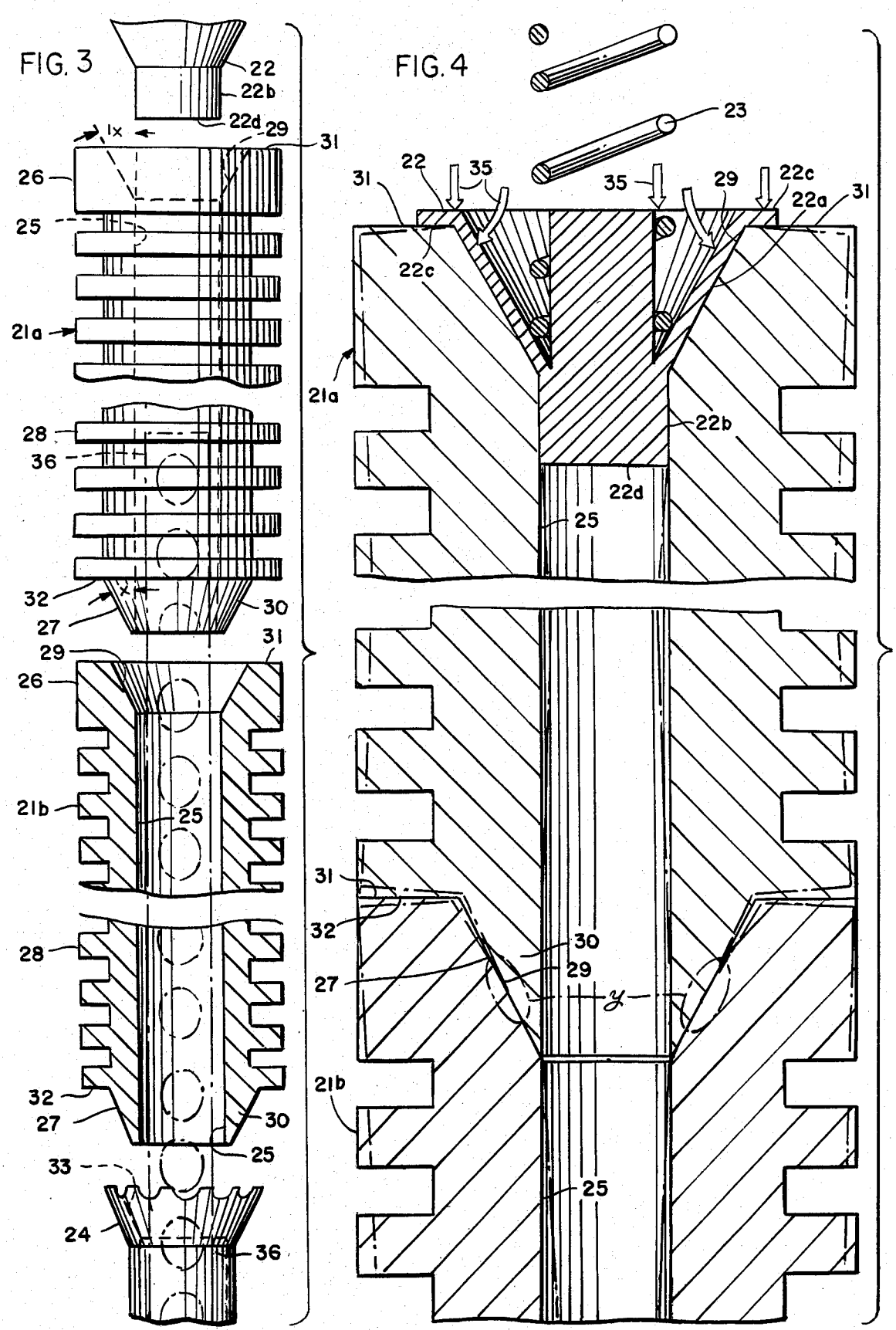

FLUID FILTERING APPARATUS AND TUBULAR FILTER THEREFOR

This application is a continuation of application Ser. No. 171,166, filed July 22, 1980, which is in turn a continuation of application Ser. No. 016,336, filed Feb. 28, 1979, both now abandoned.

BACKGROUND AND SUMMARY

Tubular filter elements or cartridges are widely used in the industrial world for the filtering of a wide variety of fluids to remove particulates and other contaminants therefrom. In general, such porous filter elements are cylindrical in shape, have generally flat end faces, and have flow passages extending axially therethrough. A number of such filter elements are normally mounted in spaced parallel relation within a suitable housing, the housing being provided with support means engaging the opposite end faces of the elements to retain such elements in operative positions within the housing chamber. Fluid enters the chamber external to the filters, flows into the axial passages of the filters through the porous semi-rigid walls thereof, and is thereafter discharged from the filter housings through suitable outlets communicating with such passages.

Conventional filter elements are formed from any of a number of natural or synthetic fibrous materials which are bonded, felted, wrapped, packed, wound or held together in some fashion to produce a porous tubular element. Some such elements tend to be rigid or even brittle in a dry state, while some may be semi-rigid or yieldable. Some elements that are rigid or brittle in a dry state may become softened and slightly yieldable or flexible in use. It has now been found that such yieldability from whatever cause may result in deformations under operative conditions which tend to cause objectionable leakage or bypass. It is believed apparent that if only one of a multiplicity of filters in a filtering apparatus becomes distorted enough to permit the bypass of contaminated fluid, the quality of the filtrate for the entire system will be seriously if not critically impaired.

While it might be thought that a filter capable of maintaining its rigidity under operative conditions would avoid such problems, it has also been found that bypass problems may develop with filters capable of resisting distortion. Conventional fibrous filter elements generally rely on the interrelation of fibers to provide the proper porosity and integrity within the body of the element. Such interrelation of fibers is interrupted at the element's ends where the ends of the fibers are exposed. In efforts to obtain effective seals between the ends of such filter elements and the supporting equipment, conventional systems depend upon some means for compressing the end fibers over a small contact area. This is not always successful in preventing bypass, whether the filter becomes semi-rigid or remains rigid in use, because such compressing action may result in the cutting, displacement, or breakdown of fibers in the sealing area.

Therefore, viewed broadly, this invention is concerned with the recognition of bypass problems in conventional filter apparatus and the discovery of a highly effective solution to them. The result is an improved filter element and, when such elements are employed in a filtering apparatus adapted to accommodate them, a superior system for filtering liquids and other fluids.

More specifically, the present invention is concerned with an improved filter element or cartridge which has a distinctive end configuration that provides greater sealing area and promotes more effective sealing contact with associated elements or components when such a filter element is used. Although limited filter distortion may occur in use, the end construction promotes better sealing engagement with the supporting elements of the filter housing, or with a similarly-constructed adajacent filter stacked therewith, than is obtainable with filters of conventional construction. In addition, the filter elements of this invention are believed easier to align and install than previous filter elements.

Briefly, a filter element of this invention takes the form of a generally cylindrical body having upper and lower end portions and an intermediate portion which may be circumferentially ribbed. The filter element is formed of conventional fibrous filter material which is rigid or semi-rigid when dry but may become semi-rigid and slightly deformable under fluid filtering conditions. In use, the unfiltered fluid is introduced external to the filter element under a pressurized condition and passes through the porous wall of the filter element into the longitudinal passage, the contaminants being removed from the fluid as the fluid passes through the wall of the element.

One of the end portions of the element, preferably the upper end portion thereof, is provided with a generally frusto-conical depression or recess, whereas the opposite end portion of the same element has a generally frusto-conical protrusion. The protrusion and recess are dimensionally similar; hence, two or more filter elemehts may be joined in endwise fashion to form a compound filter of greater length. When such a filter or filter element is installed within a filter housing, the recessed upper end portion receives a frusto-conical plug that seals the upper end of the passage, and the tapered lower end portion is received within the frusto-conical opening or socket of a tubular pedestal. Fluid filtered by the porous wall flows through the passage of the filter and through the tubular pedestal, such filtrate thereafter being discharged from the housing and collected for further use.

The recessed end of the filter element is provided with a planar annular shoulder which extends about the recess along a plane normal to the longitudinal axis of the element. Similarly, the opposite end of the filter element has a planar annular shoulder extending about the base of the frusto-conical protrusion. In use of the filter element, such planar surfaces are either spaced slightly from or only lightly engage other elements or components so that the principal sealing contact occurs along the generally frusto-conical surfaces, and it has been found that such sealing engagement along the frusto-conical surfaces tends to increase in force and effectiveness under filter-distorting conditions that would tend to result in diminished sealing effectiveness and possible fluid bypass for filter elements of conventional construction.

Other advantages, features, and objects of the invention will become more apparent from the drawings and specification.

DRAWINGS

FIG. 1 is a fragmentary vertical section of a filter assembly constructed in accordance with the teachings of the prior art.

FIG. 2 is a perspective view, shown partly in phantom, of a fluid filtering apparatus embodying the present invention.

FIG. 3 is an exploded side elevational view, partly fragmented and sectioned, of the filter assembly of this invention.

FIG. 4 is a vertical sectional view illustrating in somewhat exaggerated form the coaction between filter elements and associated elements when filter elements embodying the invention are distorted in use.

DETAILED DESCRIPTION OF PREFERRED EMBODIMENT

The structure and advantages of the filter construction of this invention can best be understood after first describing what has now been learned of the prior art. Therefore, referring to FIG. 1, the numerals 100 and 100' designate a pair of cylindrical fibrous filter elements of the type now known in the art, such elements each having an axial passage 101 extending axially therethrough and having planar end faces 102 and 103 at upper and lower ends, respectively. A series of circumferentially-extending grooves 104 may be formed in the cylindrical side surfaces of the elements to increase the outer surface area thereof. The paired filter elements are shown in axial alignment with end faces in opposed abutting relation. Such filters are held between the upper and lower fittings of a conventional filter housing, the upper fitting 105 taking the form of a cap member with a bead 106 which is urged into tight engagement with end surface 102 of the upper filter element by a spring 107 or other suitable means for applying compressive force. The bottom surface 103 of the lower filter element rests upon the circular bead 108 of a tubular pedestal 109. A perforated tubular spindle 110 extends upwardly through the passage of the lower element 100' and into the axial passage of the upper element 100 to aid in the alignment of such elements.

It will be observed that the seal between the upper surface 102 of the upper element and bead 106 is in the nature of a line seal and, similarly, the contact between bead 108 and the undersurface 103 of the lower element may be characterized as a line seal. Notwithstanding the force exerted by spring 107 or other force-applying means, it has now been found that failure of such line seals may occur under operating conditions when distortion of the filter elements occurs because of the pressure differential between the outside and inside of each element. Such distortion is represented in somewhat exaggerated form by broken lines in FIG. 1. The side walls of the filter elements 100 and 100' tend to bow inwardly with the result that the end surfaces 102 and 103 lose their planar configuration and develop a slight dome shape. Such relative movement between the beaded edges 106 and 108 takes place each time the filter elements are forced to flex or unflex in response to changes in pressure—that is, each time a filtering operation commences or stops—with the result that leakage along the line seals may tend to develop. Furthermore, where the filter elements are stacked as shown, the opposing end surfaces of the adjacent filters tend to separate from each other, thereby reducing the area of surface engagement between the undersurface 103 of upper element 100 and the upper surface 102 of lower element 100'. The result is believed to be a significant increase in the possibilities of leakage in that zone. In addition, leakage at the line seals (between bead 106 and surface 102, or between head 108 and surface 103) may occur because of a cutting or breakdown of filter material at such lines of contact, particularly if the material of the filters (commonly fibrous) is brittle or fragile.

Referring now to FIGS. 2–4, the numeral 10 generally designates a fluid filtering apparatus comprising a housing 11 having a cover or top wall 12, a cylindrical side wall 13, a bottom wall 14, and a partition or support wall 15. The partition is spaced slightly above the bottom wall to divide the interior of the housing into a main filter chamber 16 and a manifold chamber 17. An inlet 18 communicates with the upper chamber to direct unfiltered fluid into that chamber, whereas an outlet 19 communicates with the manifold chamber to convey filtrate from the housing.

Within the upper filter chamber 16 are a plurality of vertically-extending filter assemblies 20. Although only one such assembly is shown in FIG. 2 for clarity of illustration, it is to be understood that a multiplicity or cluster of such assemblies would normally be provided within the housing. Each assembly comprises a tubular filter 21, a frusto-conical plug member 22 carried by a helical spring 23 secured to the underside of cover 12, and a tubular pedestal 24 projecting upwardly from and secured to support wall 15.

Filter 21 may take the form of a single filter element or a plurality of stacked filter elements, depending on the relative dimensions of the filter elements and the height of chamber 16. In the illustration given, two such filter elements 21a and 21b are shown in vertical alignment; however, it is to be understood that a greater or smaller number may be provided.

Filter elements 21a and 21b are identical. In the particular construction shown in the drawings, each filter is formed of a porous, semi-rigid (when wet) mass of natural or synthetic fibers in a resin matrix well within the teachings of the art, is generally cylindrical in shape, has an axial passage 25 extending therethrough, and is provided with an upper end portion 26, a lower end portion 27, and a circumferentially-grooved intermediate portion 28. While such a construction is disclosed for illustrative purposes, it will be understood from what has already been stated that the features of this invention, as described hereinafter, may be useful with filter elements which omit the circumferential grooves or which differ in other respects from the precise construction depicted and described. Filter element materials suitable for use herein are found in a number of commercially-available products from various sources, one such series of products being the cartridges available from AMF Cuno Division, Meriden, Conn. under the designation "Micro-Klean II."

The upper and lower end portions of elements 21a and 21b are ungrooved as shown most clearly in FIGS. 3 and 4. Upper end portion 26 is provided with a generally frustoconical recess 29 which is aligned with axial passage 25 and communicates directly therewith. Lower end portion 27 has a generally frusto-conical outer surface defining a tapered nose or protuberance 30. The angle of taper x (FIG. 3) for both the upper recess and lower protuberance is substantially the same and should fall within the general range of 15 to 60 degrees, the preferred range being about 20 to 45 degrees. Particularly effective results have been obtained where angle x measures approximately 30 degrees.

It will be observed that a flat annular shoulder 31 extends about the mouth of recess 29, the shoulder 31 extending along a plane normal to the longitudinal axis of the filter element. Similarly, an annular shoulder 32 extends about the base or enlarged end of protuberance 30, the shoulder 32 also extending along a plane normal to the axis of the filter element. Ideally, the maximum outside diameter of protuberance 30 is slightly greater than the maximum inside diameter of recess 29. Thus, when two filter elements are coupled together as shown in FIGS. 2 and 4, the tapered projection of one is snugly received within the tapered recess of the other, the frusto-conical surfaces of the projection and recess being in tight engagement with each other, and the opposing planar surfaces 31 and 32 are spaced slightly apart or only lightly engage each other.

The tapered projection 30 of the bottom filter element 21b is received within the frusto-conical opening or socket 33 of pedestal 24, such socket communicating with the manifold chamber 17 through the hollow stem of the pedestal and an aperture in support wall 15. The taper of the socket 33 matches the taper of protrusion 30 to insure a proper interfitting relationship of parts without any cutting or breakdown of filter material.

The recess 29 at the upper end of upper filter member 21a receives the plug 22. Referring to FIG. 4, it will be observed that the plug has a frusto-conical outer surface 22a which generally matches the taper of recess 29. In addition, the plug includes an axial cylindrical extension 22b received within passage 25, and an annular flange 22c projecting laterally about the flared upper end of the plug. Spring 23 is compressed when cover 12 is closed to urge the plug into tight sealing engagement with the upper filter. Under such conditions, the underside of flange 22c bears against the shoulder 31 of the upper filter element to limit the wedging force exerted by frusto-conical portion 22a upon the tapered surface of recess 29, thereby preventing the application of forces that might otherwise damage the upper end of filter element 21a.

In the operation of the apparatus, pressure of the unfiltered liquid is exerted against the relatively large upwardly-facing surfaces of the cup-shaped plug 22 as represented by arrows 35 in FIG. 4. The area of such surfaces is substantially greater than the area of the bottom surface 22d of the plug within passage 25. Consequently, the greater external pressures act to force the plug into tight sealing engagement with the upper filter and to maintain such sealing engagement throughout operation of the filtering apparatus.

The effectiveness of such sealing engagement is enhanced by any deformation of the filter element 21a which tends to occur during a filtering operation. Such deformation is represented in somewhat exaggerated form in FIG. 4 by phantom lines. It will be noted that forces which tend to cause the side wall of the upper filter to bow inwardly also bring the inside surfaces of that filter member into even tighter sealing engagement with surfaces 22a and 22b of the plug.

As previously described in connection with the prior art, any inward bowing of the sides of a filter tends to cause separation of the opposing planar surfaces of adjacent filter elements. In the embodiment of this invention, opposing annular surfaces 31 and 32 would ordinarily be spaced slightly apart, or would only lightly engage each other, because the principal sealing action must occur between frusto-conical surfaces 27 and 29. Nevertheless, the deforming forces arising during operation of the system do tend to result in spreading movement of surfaces 31 and 32. Such deformation has the effect of increasing the tightness of the seal between the mating frusto-conical surfaces in zone y delineated in FIG. 4. In other words, the nose portion 30 tends to expand laterally outwardly as the upper filter element 21a is deformed by the pressure differential and, at the same time, the frusto-conical surface of the recess 29 tends to be displaced inwardly as the lower filter element 21b is deformed. The sloping surfaces of the recess and protuberance are thus urged into even tighter engagement to maintain an effective fluid-tight seal between the parts.

A somewhat similar action occurs at the lower end of filter 21b although, of course, no inward flexure of pedestal 24 (preferably formed of steel, as are other components of the apparatus excluding the disposable filter elements) would be expected to occur. Nevertheless, the tendency of the nose or protuberance of the lower filter element 21b to expand laterally as that element is deformed in use would have the effect of bringing the frusto-conical surface of that protuberance into even tighter sealing engagement with the frusto-conical surface 33 of the pedestal.

When replacement of the disposable filter elements is required, cover 12 is removed, the dirty filter elements are removed from filter chamber 16, and fresh filter elements are fitted into place. Perforated hollow spindles 36 shown in phantom in FIG. 3 may be included as part of the apparatus to facilitate such insertion and alignment of new filters. It is believed apparent, however, that the need for such spindles is reduced if not completely obviated by the filter construction disclosed herein, since the tapered protuberances of the filters, as well as the tapered recesses thereof and the tapered opening 32 of the pedestals, assist in directing and seating the filters into proper sealing positions.

While in the foregoing I have disclosed an embodiment of this invention in considerable detail for purposes of illustration, it will be understood by those skilled in the art that many of these details may be varied without departing from the spirit and scope of the invention.

I claim:

1. A filter element comprising an elongated body formed of porous fluid-filtering material capable of limited deformation under conditions of use and provided with a flow passage extending longitudinally therethrough; said body having an upper end portion, lower end portion, and an intermediate portion, wherein the improvement comprises said body having a frusto-conical recess in one of its end portions and a frusto-conical protrusion provided by the other of said end portions, said protrusion and said recess being coaxial and the surfaces thereof defining said frusto-conical protrusion and recess, respectively, being of substantially the same slope and being formed of said porous filtering material, said protrusion and recess each being dimensioned to mate with a respective recess or protrusion of another identical filter element coaxial therewith, siad frusto-conical protrusion having a maximum diameter greater than the maximum diameter of said recess.

2. The filter element of claim 1 wherein said included angle falls within the range of 15 to 60 degrees.

3. The filter element of claim 2 in which said included angle falls within the range of about 20 to 45 degrees.

4. The filter element of claim 2 in which said included angle is approximately 30 degrees.

5. A filter element comprising an elongated body formed of porous fluid-filtering material capable of limited deformation under conditions of use and provided with a flow passage extending longitudinally therethrough; said body having an upper end portion, a lower end portion and an intermediate portion, wherein the improvement comprises said body having a frusto-conical recess in one of its end portions and a frusto-conical protrusion provided by the other of said end portions, said protrusion and said recess being coaxial and the surfaces thereof defining said frusto-conical protrusion and recess, respectively, being of substantially the same slope and being formed of said porous filtering material, said recess and said protrusion each being surrounded by an annular shoulder lying in a plane normal to the longitudinal midline of said body, said protrusion and recess each being dimensioned to mate with a respective recess or protrusion of another identical filter element coaxial therewith, said frusto-conical protrusion having a maximum diameter greater than the maximum diameter of said recess.

6. The structure of claim 1 or 5 in which a plurality of said filter elements are assembled in end-to-end interfitting engagement to form a plural-element compound filter.

7. The filter element of claim 1 or 5 in which said intermediate portion has a series of longitudinally-spaced annular grooves extending throughout the length of said intermediate portion.

8. A fluid filtering apparatus comprising a casing having a cover and defining a filtering chamber, an upstanding pedestal disposed in said chamber adjacent the lower end thereof, a plug member carried by said cover, and a tubular filter supported by said pedestal and said plug member within said chamber, said filter being formed of a fluid-filtering porous material capable of limited deformation under conditions of use, wherein the improvement comprises said filter having a frusto-conical recess at its upper end and a frusto-conical protrusion at its lower end, said recess and protrusion being coaxial and defined by surfaces formed of said porous material, said plug member being frusto-conical and being sealingly received in said recess, and said pedestal having a frusto-conical opening and sealingly receiving said protrusion, said protrusion, recess, plug, and opening having frusto-conical surfaces of substantially the same slope, the maximum diameter of said frusto-conical protrusion being greater than the maximum diameter of said recess.

9. The apparatus of claim 8 in which said plug member is also provided with a laterally-projecting annular flange at the enlarged end thereof, said flange and said filter having opposing annular surfaces adapted to engage each other, said annular surface of said filter being formed of said porous material.

10. The apparatus of claim 8 in which said frusto-conical plug member, recess, protrusion, an opening all taper at a selected angle within the range of 15 to 60 degrees measured from the longitudinal axis of said filter.

11. The apparatus of claim 10 in which said angle falls within the range of about 20 to 45 degrees.

12. The apparatus of claim 11 in which said included angle is approximately 30 degrees.

13. The apparatus of claim 8 in which said filter has an intermediate portion provided with a longitudianl series of annular grooves for increasing the external surface area thereof.

14. A fluid filtering apparatus comprising a casing having a cover and defining a filtering chamber, an upstanding pedestal disposed in said chamber adjacent the lower end thereof, a plug member carried by said cover, and a tubular filter supported by said pedestal and said plug member within said chamber, said filter being formed of a fluid-filtering porous material capable of limtied deformation under conditions of use, wherein the improvement comprises said filter having a frusto-conical recess at its upper end and a frusto-conical protrusion at its lower end, said recess and protrusion being coaxial and the surfaces thereof defining said frusto-conical protrusion and recess, respectively, being of the same slope and being formed of said porous material, said plug member being frusto-conical and being sealingly received in said recess, and said pedestal having a frusto-conical opening and sealingly receiving said protrusion, said filter also including annular shoulders surrounding said recess and said protrusion, said shoulders extending in planes normal to the axis of said filter and being defined by surfaces formed of sid porous material, said frusto-conical protrusion having a maximum diameter larger than the maximum diameter of said recess.

15. The apparatus of claim 8, 9, 10, 11, 12, 13, or 14 in which said filter comprises at least two substantially identical filter elements joined together in end-to-end alignment with the frustoconical surface of the protrusion of one element tightly engaging the frusto-conical surface of the recess of another element.

16. A filter element comprising an elongated body formed of porous fluid-filtering material capable of limited deformation under conditions of use and provided with a flow passage extending longitudinally therethrough; said body havng an upper end portion, lower end portion, and an intermediate portion, wherein the improvement comprises said body having a frusto-conical recess in one of its end portions and a frusto-conical protrusion provided by the other of said end portions, said protrusion and said recess being coaxial and the surfaces thereof defining said frusto-conical protrusion and recess, respectively, being of substantially the same slope and being formed of said porous filtering material, said protrusion and recess each being dimensioned to mate with a respective recess or protrusion of another identical filter element coaxial therewith, said frusto-conical recess having the surface thereof sloping longitudinally and radially inwardly and merging at its innermost limits with the surface of said passage.

17. The filter element of claim 16 in which said recess and said protrusion are each surrounded by an annular shoulder lying in a plane normal to the longitudinal midline of said body.

18. A fluid filtering apparatus comprising a casing having a cover and defining a filtering chamber, an upstanding pedestal disposed in said chamber adjacent the lower end thereof, a plug member carried by said cover, and a tubular filter supported by said pedestal and said plug member within said chamber, said filter being formed of a fluid-filtering porous material capable of limited deformation under conditions of use and provided with a flow passage extending longitudinally therethrough, wherein the improvement comprises said filter having a frusto-conical recess at its upper end and a frusto-conical protrusion at its lower end, said recess and protrusion being coaxial and defined by surfaces formed of said porous material, said plug member being frusto-conical and being sealingly received in said recess, and said pedestal having a frusto-conical opening and sealingly receiving said protrusion, said protrusion, recess, plug, and opening having frusto-conical surfaces of substantially the same slope, said frusto-conical recess having the surface thereof sloping longitudinally and radially inwardly and merging at its innermost limits with the surface of said passage.

19. The fluid filtering apparatus of claim 18 in which said filter also includes annular shoulders surrounding said recess and said protrusion, said shoulders extending in planes normal to the axis of said filter and being defined by surfaces formed of said porous material.

* * * * *